(12) United States Patent
Luo et al.

(10) Patent No.: US 11,804,340 B2
(45) Date of Patent: Oct. 31, 2023

(54) INPUT APPARATUS AND ELECTRONIC DEVICE INCLUDING INPUT APPARATUS

(71) Applicant: Huawei Technologies Co., Ltd., Shenzhen (CN)

(72) Inventors: Junchao Luo, Wuhan (CN); Yi Yu, Wuhan (CN); Peng Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/446,060

(22) Filed: Aug. 26, 2021

(65) Prior Publication Data
US 2021/0391128 A1 Dec. 16, 2021

Related U.S. Application Data

(63) Continuation of application No. PCT/CN2019/076353, filed on Feb. 27, 2019.

(51) Int. Cl.
*H01H 13/14* (2006.01)
*G06F 3/01* (2006.01)
(Continued)

(52) U.S. Cl.
CPC .............. *H01H 13/14* (2013.01); *G06F 3/016* (2013.01); *G06F 3/0362* (2013.01); *H01H 13/20* (2013.01)

(58) Field of Classification Search
CPC ........ H01H 13/14; H01H 13/20; H01H 3/122; H01H 3/125; H01H 13/84; G06F 3/016; G06F 3/0362; G06F 3/03547
See application file for complete search history.

(56) References Cited

U.S. PATENT DOCUMENTS 4,307,268 A 12/1981 Harper
10,510,499 B1 * 12/2019 Huang .................... G06F 1/169
(Continued)

FOREIGN PATENT DOCUMENTS

CN 1209597 A 3/1999
CN 2381009 Y 5/2000
(Continued)

OTHER PUBLICATIONS

Machine translation of CN100422910C (Year: 2008).*

*Primary Examiner* — Patrick N Edouard
*Assistant Examiner* — Joseph P Fox
(74) *Attorney, Agent, or Firm* — HUAWEI TECHNOLOGIES CO., LTD.

(57) ABSTRACT

Embodiments of this application provide an input apparatus and an electronic device including the input apparatus. The input apparatus includes a top cover, where at least one trench is disposed in a first area of the top cover; a base, where at least one slot group is disposed in a second area of the base, and projections of the second area and the first area in a pressing or tapping direction overlap; a tactile switch, including a force-bearing surface and disposed on the top cover or the base; and at least one connecting rod, disposed between the top cover and the base, where the connecting rod includes a main rod and a side rod group, the main rod is rotatably nested in a corresponding trench, and each side rod in the side rod group is slidably nested in a corresponding slot in the slot group.

10 Claims, 4 Drawing Sheets

(51) Int. Cl.
     *G06F 3/0362*    (2013.01)
     *H01H 13/20*     (2006.01)

(56) References Cited

U.S. PATENT DOCUMENTS

| | | |
|---|---|---|
| 2001/0048379 A1 | 12/2001 | Kaikuranta et al. |
| 2010/0302153 A1* | 12/2010 | Jung .................... G06F 3/03547 |
| | | 345/158 |
| 2011/0102358 A1* | 5/2011 | Aono .................... G06F 3/0414 |
| | | 345/173 |
| 2015/0009156 A1 | 1/2015 | Hsueh |
| 2015/0185779 A1* | 7/2015 | Doi ....................... G06F 1/1662 |
| | | 181/207 |
| 2016/0336127 A1* | 11/2016 | Leong .................... H01H 13/85 |

FOREIGN PATENT DOCUMENTS

| | | | |
|---|---|---|---|
| CN | 2762312 Y | | 3/2006 |
| CN | 100422910 C | * | 10/2008 |
| CN | 101425418 A | | 5/2009 |
| CN | 102376468 A | | 3/2012 |
| CN | 103325603 A | | 9/2013 |
| CN | 203277169 U | | 11/2013 |
| CN | 203859029 U | | 10/2014 |
| CN | 206516535 U | | 9/2017 |
| CN | 108933054 A | | 12/2018 |
| CN | 208521832 U | | 2/2019 |
| JP | H1092261 A | | 4/1998 |
| JP | 2015035340 A | | 2/2015 |

\* cited by examiner

INPUT APPARATUS AND ELECTRONIC DEVICE INCLUDING INPUT APPARATUS

CROSS-REFERENCE TO RELATED APPLICATIONS

This application is a continuation of International Application No. PCT/CN2019/076353, filed on Feb. 27, 2019, the disclosure of which is hereby incorporated by reference in its entirety.

TECHNICAL FIELD

This application relates to the field of electronic device technologies, and in particular, to an input apparatus and an electronic device including the input apparatus.

BACKGROUND

An input apparatus such as a clickpad is widely used in various electronic devices such as a notebook computer and a tablet computer. A touch switch of the clickpad is usually located below a free side of the clickpad. When using the clickpad, a user triggers the touch switch by pressing or tapping the free side of the clickpad, to generate input.

In the conventional technology, a clickpad has poor rigidity. When a user presses an end or a corner of a free side of the clickpad, a clickpad top cover deforms. As a result, the user has a soft hand feeling, and even cannot trigger a tactile switch, and no input can be generated, thereby affecting a hand feeling and input experience of the user.

SUMMARY

Embodiments of this application provide an input apparatus and an electronic device including the input apparatus, to enhance strength of a top cover, thereby improving a hand feeling and input experience of a user.

According to a first aspect, an input apparatus used in an electronic device is provided. The input apparatus includes:
a top cover, where at least one trench is disposed in a first area of the top cover;
a base, where at least one slot group is disposed in a second area of the base, and projections of the second area and the first area in a pressing or tapping direction overlap;
a tactile switch, including a force-bearing surface and disposed on the top cover or the base; and
at least one connecting rod, disposed between the top cover and the base, where the connecting rod includes a main rod and a side rod group, the main rod is rotatably nested in a corresponding trench, and each side rod in the side rod group is slidably nested in a corresponding slot in the slot group; and when the first area is pressed or tapped, the first area moves toward the base, so that the main rod of the connecting rod rotates in the trench, and each side rod of the connecting rod slides in a corresponding slot, to drive the first area to entirely move down, thereby triggering the tactile switch.

In a possible implementation, each slot group includes two slots, and two slots belonging to a same slot group are distributed on two sides of a connection line between the tactile switch and a center point of the main rod, and are symmetrical along the connection line between the tactile switch and the center point of the main rod; and each side rod group includes two side rods, and two side rods belonging to a same side rod group distributed on the two sides of the connection line between the tactile switch and the center point of the main rod, and are symmetrical along the connection line between the tactile switch and the center point of the main rod.

In this implementation, side rods of one side rod group are on two sides of the connection line between the tactile switch and the center point of the main rod, so that the connecting rod can drive the first area to entirely and smoothly move down.

In a possible implementation, N slot groups are disposed in the second area; and one connecting rod is disposed between the top cover and the base, where the connecting rod includes one main rod and N side rod groups, and N is an integer greater than 1.

In this implementation, one connecting rod is disposed, and includes a plurality of side rod groups, so that smoothness of downward moving of the entire first area is maintained while a weight of the input apparatus is further reduced.

In a possible implementation, N trenches are disposed in the first area; N slot groups are disposed in the second area; and N connecting rods are disposed between the top cover and the base, where each connecting rod includes one main rod and one side rod group, and is of a U-shaped structure; main rods of the N connecting rods are parallel to each other; sizes of the N connecting rods successively change along a direction toward a connection line between a center of the first area and a center of the second area; that the sizes successively change includes that lengths of the main rods and lengths of side rods successively decrease, so that the N connecting rods are nested in respective corresponding trenches and slot groups; and N is an integer greater than 1.

In this implementation, disposing a plurality of connecting rods can further enhance strength of the top cover, and improve smoothness of downward moving of the top cover. In addition, sizes of the connecting rods are successively reduced to minimize a weight, and smoothness of downward moving of the first area is further improved, so that a user has a better hand feeling of tapping or pressing the input apparatus.

In a possible implementation, the top cover includes a circuit board and a circuit board bracket that are successively stacked along the pressing or tapping direction; the circuit board bracket is configured to fasten the circuit board; the tactile switch is communicatively connected to the circuit board, and is configured to control the circuit board; and the first area is an area on the circuit board bracket.

In this implementation, disposing the circuit board bracket can protect the circuit board, and enhance strength of the top cover.

In a possible implementation, the tactile switch is mounted on the circuit board, and an area that is in the first area and that corresponds to the tactile switch is of a hollow structure, so that the force-bearing surface of the tactile switch is in contact with the second area in a state in which the top cover is not pressed or tapped.

In this implementation, the force-bearing surface of the tactile switch is in contact with the second area, so that an extra invalid stroke is eliminated, and a hand feeling of a user is improved.

In a possible implementation, the tactile switch is mounted on the first area, so that the force-bearing surface of the tactile switch is in contact with the second area in a state in which the top cover is not pressed or tapped.

In this implementation, the force-bearing surface of the tactile switch is in contact with the second area, so that an extra invalid stroke is eliminated, and a hand feeling of a user is improved.

In a possible implementation, the tactile switch is mounted on the second area, so that the force-bearing surface of the tactile switch is in contact with the first area in a state in which the top cover is not pressed or tapped.

In this implementation, the force-bearing surface of the tactile switch is in contact with the second area, so that an extra invalid stroke is eliminated, and a hand feeling of a user is improved.

In a possible implementation, in a left-right direction of the input apparatus, a middle section of the force-bearing surface of the tactile switch coincides with a middle section of the first area, or a middle section of the force-bearing surface of the tactile switch coincides with a middle section of the second area.

In this implementation, the tactile switch is located in a middle area of the first area or the second area, and can be better triggered.

In a possible implementation, the tactile switch is either of the following:

a metal dome switch and a rubber dome switch.

In this implementation, the metal dome switch or the rubber dome switch is used as the tactile switch, to provide elasticity for resetting the input apparatus, and further improve a hand feeling of a user.

In a possible implementation, a force of the tactile switch is not less than 180 gf.

In this implementation, the used tactile switch can provide sufficient elasticity for resetting the input apparatus.

According to a second aspect, an electronic device is provided, including the input apparatus in the first aspect.

In the input apparatus provided in the embodiments of this application, the connecting rod is disposed between the top cover and the base, the main rod of the connecting rod is nested in the trench on the top cover, the side rod of the connecting rod is nested in the slot on the base, and when the top cover is pressed or tapped, the main rod rotates in the trench, to drive the side rod to slide in the slot, and drive the top cover to entirely move toward the base, so that the strength of the top cover is enhanced without significantly increasing the weight of the input apparatus, and the tactile switch can be better triggered.

Figure 1:
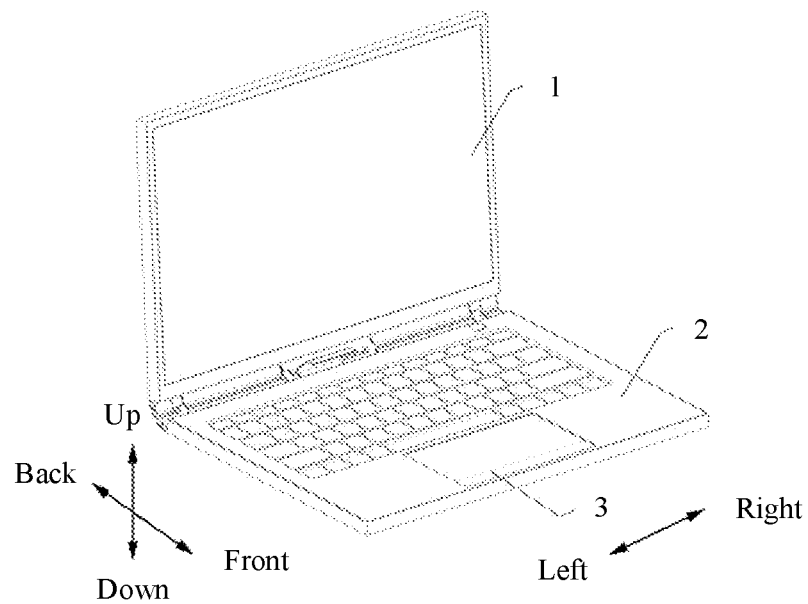
FIG. 1 is a schematic three-dimensional structural diagram of an electronic device according to an embodiment of this application.

In the drawings: 1. display screen; 2. main casing; 201. main casing top cover; 202. main casing bottom cover; 3. input apparatus; 301. surface protective layer; 302. circuit board; 303. circuit board bracket; 3031. first sub-trench; 3032. second sub-trench; 304. first connecting rod; 305. second connecting rod; 306. base; 3061. second area; 30611. first slot; 30612. second slot; 30613. structural hammer; 308. tactile switch; 401. first screw; 402. second screw; 403. third screw; 404. fourth screw; 405. fifth screw; 406. sixth screw; 407. seventh screw.

DESCRIPTION OF EMBODIMENTS

The following describes technical solutions of the embodiments in this application with reference to accompanying drawings. It is clear that the described embodiments are merely some but not all of the embodiments of this application.

FIG. 1 is a schematic three-dimensional structural diagram of an electronic device. As shown in FIG. 1, the electronic device is a notebook computer with a display screen 1 and a main casing 2. The display screen 1 and the main casing 2 may be connected by using one or more pairs of hinges, so that the display screen 1 is opened or closed relative to the main casing 2. Components such as a processor (not shown), a memory (not shown), a fan (not shown), and a bus (not shown) are disposed inside the main casing.

Figure 2:
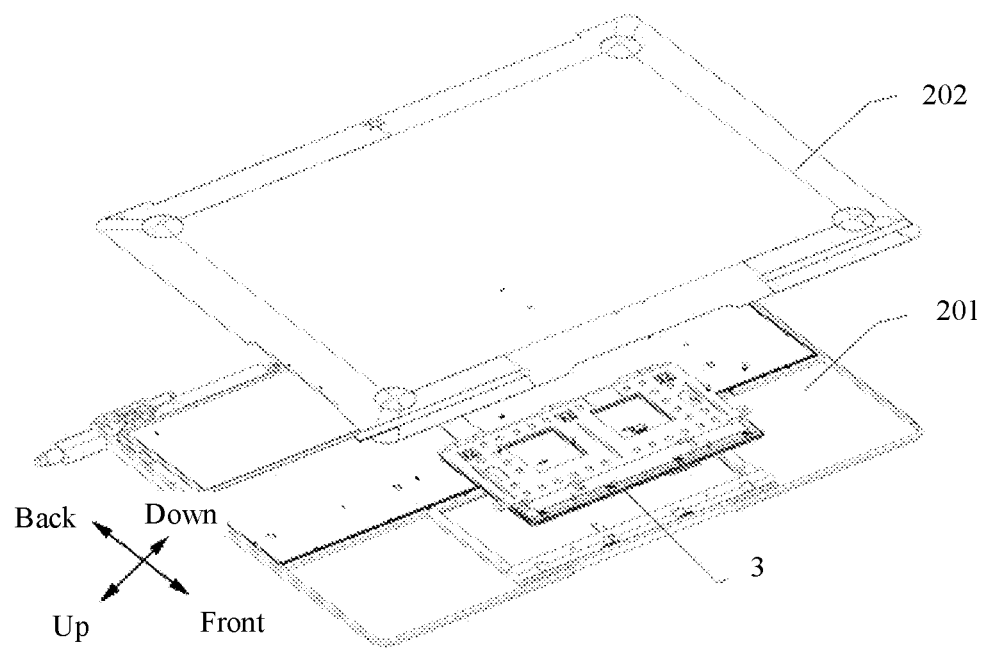
FIG. 2 is an exploded view of a main casing of an electronic device shown in FIG. 1.
Figure 3:
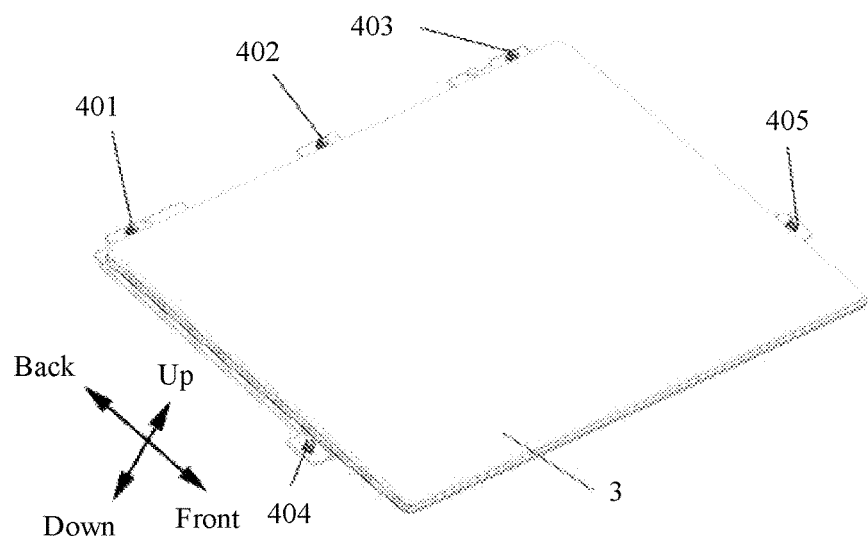
FIG. 3 is a schematic three-dimensional structural front view of an input apparatus according to an embodiment of this application.
Figure 4:
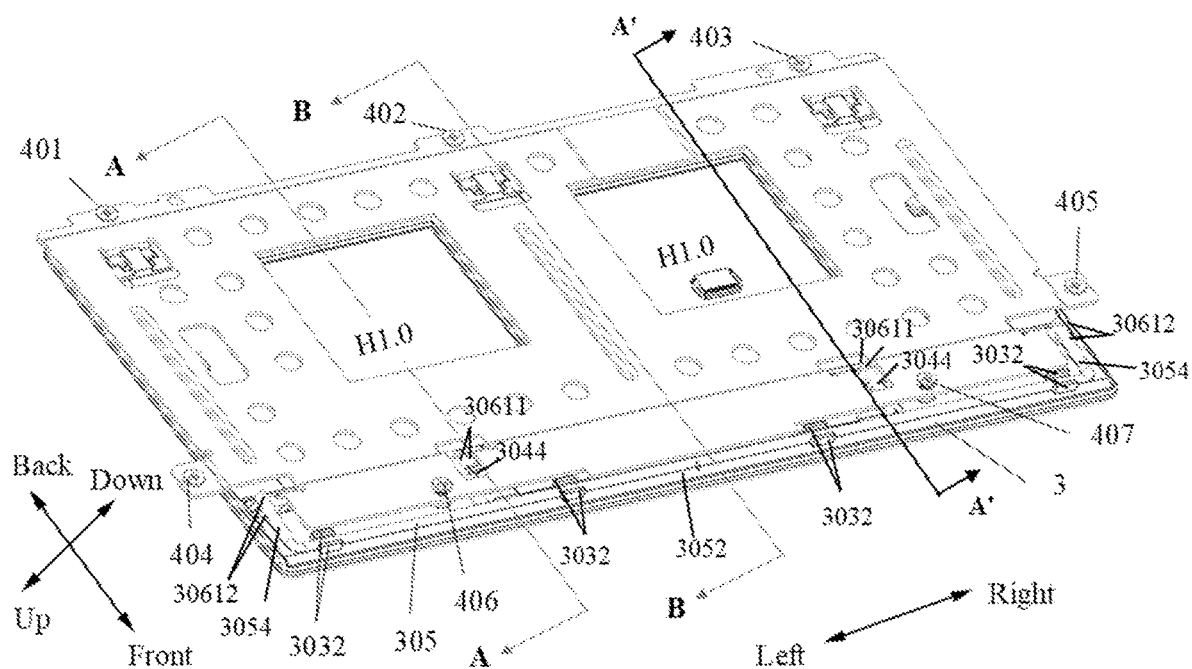
FIG. 4 is a schematic three-dimensional structural bottom view of an input apparatus shown in FIG. 3.

Referring to FIG. 2, based on a use state of the electronic device shown in FIG. 1, a direction toward a user is referred to as front, a direction away from the user is referred to as back, a thickness direction of the main casing 2 is referred to as an up-down direction, and a width direction of the main casing 2 is referred to as a left-right direction. The main casing 2 includes a main casing top cover 201 and a main casing bottom cover 202. An input apparatus 3 is mounted in the middle of a front part of the main casing 2. Referring to FIG. 2 and FIG. 3, the input apparatus 3 is fastened on the main casing top cover 201 by using a first screw 401, a second screw 402, a third screw 403, a fourth screw 404, a fifth screw 405, a sixth screw 406, and a seventh screw 407.

It should be noted that, that the input apparatus 3 provided in this embodiment of this application is mounted on the notebook computer is used as an example to describe a function and a structure of the input apparatus 3, but does not mean that the input apparatus 3 is definitely mounted on the notebook computer. The input apparatus 3 may alternatively exist independently, or may be mounted on a single keyboard, or may be mounted on a tablet computer, or may be mounted on a telephone set. The input apparatus 3 may alternatively exist independently, and may be communicatively connected to a target electronic device during use, to implement input to the target electronic device. An application scenario of the input apparatus 3 is not limited in this embodiment of this application.

The following describes the input apparatus 3 with reference to FIG. 4, FIG. 5, FIG. 6, and FIG. 7. It is readily understood that, in a use state of the input apparatus 3, a direction in which a user presses or taps the input apparatus 3 is usually from top to bottom. Therefore, in FIG. 4, FIG. 5, FIG. 6, and FIG. 7, a pressing or tapping direction is indicated by an up-down direction.

The input apparatus 3 includes a top cover, a tactile switch 308, and a base 306.

The base 306 may also be referred to as a backplane bracket. Screw holes for the first screw 401, the second screw 402, the third screw 403, the fourth screw 404, the fifth screw 405, the sixth screw 406, and the seventh screw 407 are located on the base 306. Fastening the input apparatus 3 on the main casing top cover 201 is specifically fastening the base 306 on the main casing top cover 201 by using the first screw 401, the second screw 402, the third screw 403, the fourth screw 404, the fifth screw 405, the sixth screw 406, and the seventh screw 407.

At least one trench is disposed in a first area 3030 of the top cover. At least one slot group is disposed in a second area 3061 of the base 306. The second area 3061 is located on a front side of the base 306. Projections of the second area 3061 and the first area 3030 in the pressing or tapping direction overlap.

It should be noted that the projections of the second area 3061 and the first area overlap, but do not necessarily coincide. That the projections overlap herein is merely intended to describe a relative location relationship between the second area 3061 and the first area, and limit shapes and sizes of the second area 3061 and the first area. Screw holes corresponding to the sixth screw 406 and the seventh screw 407 are located in the second area 3061, but the sixth screw 406 and the seventh screw 407 are configured to fasten only the base 306, but not to fasten the first area. During specific implementation, the sixth screw 406 and the seventh screw 407 may separately pass through two holes in the first area to be fastened to the main casing top cover 201, and apertures of the two holes in the first area are greater than diameters of screw rods of the sixth screw 406 and the seventh screw 407, so that the sixth screw 406 and the seventh screw 407 do not limit the first area.

The second area 3061 sinks (away from the top cover) relative to a rest part of the base 306, to form a gap between the second area 3061 and the first area.

The tactile switch 308 includes a force-bearing surface, and may be disposed on the top cover or the base 306.

At least one connecting rod is disposed between the top cover and the base 306. The connecting rod includes a main rod and a side rod group. The main rod is rotatably nested in a corresponding trench. Each side rod in the side rod group is slidably nested in a corresponding slot in the slot group. When the first area is pressed or tapped, the first area moves toward the base 306, so that the main rod of the connecting rod rotates in the trench, and each side rod of the connecting rod slides in a corresponding slot, to drive the first area to entirely move down, thereby triggering the tactile switch 308.

When a corner of the top cover is pressed or tapped, the connecting rod may drive the first area of the top cover to entirely move toward the base 306, so that the tactile switch 308 can be triggered to generate input.

The following describes the components of the input apparatus 3 in detail.

The base 306 may be made of comparatively rigid stainless steel, and the slot in the slot group may include two elastic arms with micro-elasticity, so that the side rod of the connecting rod slides in the slot. During specific implementation, the elastic arm may be made of stainless steel that is less rigid than and more elastic than the base 306, and the connecting rod may be made of comparatively rigid stainless steel. The connecting rod may be of a hollow tubular structure to further reduce a weight.

In an embodiment, each slot group includes two slots, two slots belonging to a same slot group are distributed on two sides of a connection line between the tactile switch 308 and a center point of the main rod, and are symmetrical along the connection line between the tactile switch 308 and the center point of the main rod, each side rod group includes two side rods, and two side rods belonging to a same side rod group distributed on the two sides of the connection line between the tactile switch 308 and the center point of the main rod, and are symmetrical along the connection line between the tactile switch 308 and the center point of the main rod.

In an example of the foregoing embodiment, N trenches 3031, 3032 are disposed in the first area 3030; N slot groups are disposed in the second area 3061; and N connecting rods 304, 305 are disposed between the top cover and the base, where each connecting rod 304 or 305 includes one main rod 3042 or 3052 and one side rod group 3044 or 3054, and is of a U-shaped structure; main rods 3042, 3052 of the N connecting rods 304, 305 are parallel to each other; sizes of the N connecting rods 304, 305 successively change along a direction toward a connection line between a center of the first area 3030 and a center of the second area 3061; that the sizes successively change includes that lengths of the main rods 3042, 3052 and lengths of side rods 3044, 3054 successively decrease, so that the N connecting rods 304, 305 are nested in respective corresponding trenches and slot groups; and N is an integer greater than 1.

When there are a plurality of trenches, a plurality of slot groups, and a plurality of connecting rods, the plurality of trenches are successively close to the center of the first area in two directions: from front to back, and from left and right sides to the middle. The plurality of slot groups may be successively close to the center of the second area 3061 from left and right sides to the middle. All slots in the plurality of slot groups may be on a straight line, or may not be on a straight line. The main rods of the N connecting rods are disposed in parallel. The sizes of the N connecting rods successively change along the direction toward the connection line between the center of the first area and the center of the second area 3061. That the sizes successively change includes that the lengths of the main rods successively decrease, so that the N connecting rods can be nested in corresponding trenches.

When all the slots in the plurality of slot groups are on a straight line, that the sizes of the N connecting rods successively change further includes that the lengths of the side rods of the N connecting rods successively decrease (side rods belonging to a same connecting rod have a same length), so that the side rods of the N connecting rods can be nested in the slot groups.

When all the slots in the plurality of slot groups are not on a straight line, a length of each side rod is set based on a location of a corresponding slot, so that the side rod can be nested in the corresponding slot.

With reference to FIG. 4, FIG. 5, FIG. 6, and FIG. 7, the following provides detailed descriptions by using two trenches, two slot groups, and two connecting rods as examples.

The two connecting rods are a first connecting rod 304 and a second connecting rod 305. A size of the first connecting rod 304 is less than a size of the second connecting rod 305. A manifestation is that a main rod 3042 of the first connecting rod 304 is shorter than a main rod 3052 of the second connecting rod 305, and two side rods 3044 of the first connecting rod 304 are also shorter than the main rod 3052 of the second connecting rod 305. Further, the first connecting rod 304 is also thinner than the second connecting rod 305, so that space can be saved, and the input apparatus 3 can be designed to be thinner.

A trench may include a plurality of distributed sub-trenches. A trench corresponding to the second connecting rod 305 is used as an example. The trench includes a plurality of parallel second sub-trenches 3032.

A slot is a mechanism including two elastic arms, and a side arm of a connecting rod is clamped between the two elastic arms of the slot. For details, refer to a structure of a first slot 30611 shown in FIG. 6 and a structure of a second slot 30612 shown in FIG. 5.

Figure 5:
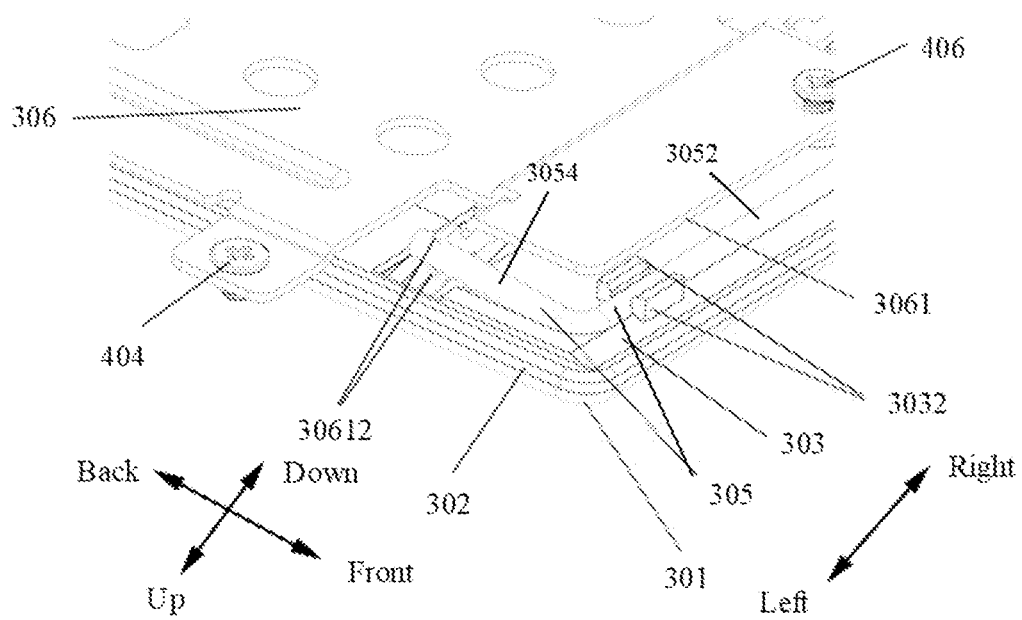
FIG. 5 is a partial enlarged view of an input apparatus shown in FIG. 4.
Figure 6:
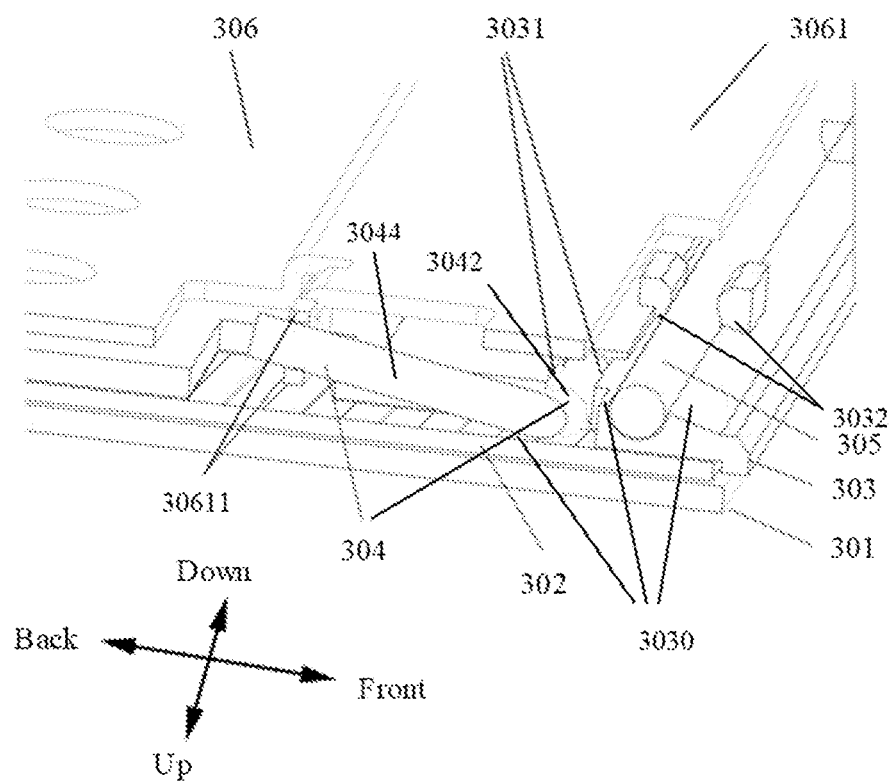
FIG. 6 is an A-A or A'-A' cutaway cross-sectional view of an input apparatus shown in FIG. 4.
Figure 7:
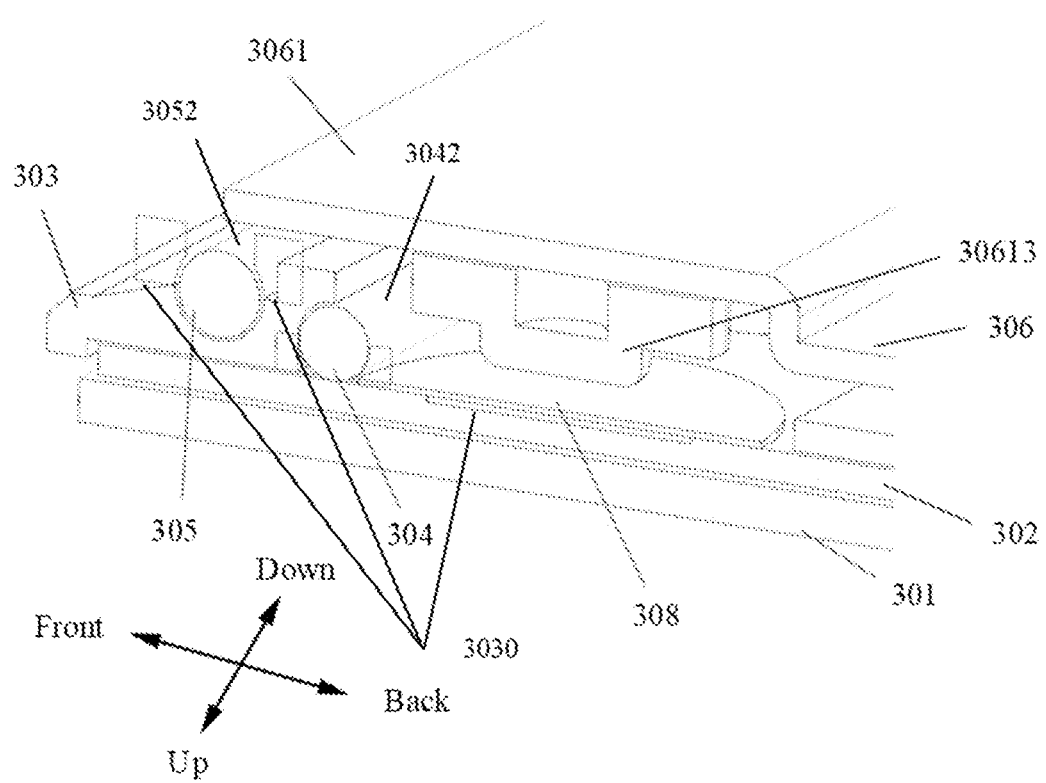
FIG. 7 is a B-B cutaway cross-sectional view of an input apparatus shown in FIG. 4.

It is readily understood that, with reference to a structure of a connecting rod, a trench closer to the center of the first area is suitable for a connecting rod with a smaller size. With reference to locations of the N trenches, a slot group closer to the center of the second area 3061 is suitable for a connecting rod with a smaller size. The first connecting rod 304 is nested in an inner slot group and an inner trench. The second connecting rod 305 is nested in an outer slot group and an outer trench. Specifically, as shown in FIG. 6, the main rod 3042 of the first connecting rod 304 is nested in a trench including a first sub-trench 3031, one side rod 3044 of the first connecting rod 304 is nested in the first slot 30611, and the other side rod (not shown) of the first connecting rod 304 is nested in a slot (not shown) that belongs to the same slot group as that of the first slot 30611. As shown in FIG. 5, the main rod 3052 of the second connecting rod 305 is nested in a trench including a second sub-trench 3032, one side rod 3054 of the second connecting rod 305 is nested in the second slot 30612, and the other side rod (not shown) of the second connecting rod 305 is nested in a slot (not shown) that belongs to the same slot group as that of the second slot 30612.

In this example, disposing a plurality of connecting rods can further enhance strength of the top cover, and improve smoothness of downward moving of the top cover. In addition, sizes of the connecting rods are successively reduced to minimize a weight, and smoothness of downward moving of the first area is further improved, so that a user has a better hand feeling of tapping or pressing the input apparatus.

In an example of the foregoing embodiment, N slot groups are disposed in the second area 3061; and one connecting rod is disposed between the top cover and the base 306, where the connecting rod includes one main rod and N side rod groups, and N is an integer greater than 1. In this example, one trench may be disposed in the first area. For a structure of the trench, refer to the foregoing descriptions. Details are not described herein again. One connecting rod includes N side rod groups. Distribution of side rods in the N side rod groups corresponds to that of slots in the N slot groups, so that side rods of each side rod group are separately nested in a corresponding slot group. For specific disposing of the side rods of each side rod group and the slot group, refer to the foregoing descriptions. Details are not described herein again. In this example, one connecting rod including a plurality of side rod groups is disposed, to enhance strength of the top cover while further reducing a weight, thereby improving smoothness of downward moving of the entire first area of the top cover.

In an embodiment, the tactile switch 308 may be disposed in a center. Specifically, in a left-right direction of the input apparatus 3, a middle section of the force-bearing surface of the tactile switch 308 coincides with a middle section of the first area, or a middle section of the force-bearing surface of the tactile switch 308 coincides with a middle section of the second area 306.

After an effect of pressing or tapping disappears, the input apparatus 3 is reset through elastic rebound of the tactile switch 308. The tactile switch may be a metal dome (metal dome) switch or a rubber dome (rubber dome) switch. To ensure that the tactile switch 308 has sufficient elasticity for resetting the input apparatus 3, a force of the tactile switch 308 is not less than 180 gf.

The top cover includes a circuit board 302 and a circuit board bracket 303 that are successively stacked along the pressing or tapping direction. The circuit board bracket 303 is configured to fasten the circuit board 302. The tactile switch 308 is communicatively connected to the circuit board 302, and is configured to control the circuit board 302. The first area 3030 is an area on the circuit board bracket 303.

In an example, the circuit board 302 may be specifically a printed circuit board. More specifically, the circuit board 302 may be specifically a flexible circuit board.

In an example, the top cover may further include a surface protective layer 301. Along the pressing or tapping direction, the surface protective layer 301, the circuit board 302, and the circuit board bracket 303 are successively adjacent, and are pasted as a component by using double-sided tape. The component is the top cover.

In an example, the surface protective layer 301 may be a cover film, and may be specifically a cover Mylar. The surface protective layer 301 may be cover glass (cover glass).

In an embodiment, the tactile switch 308 may be mounted on the circuit board 302, and an area that is in the first area 3030 and that corresponds to the tactile switch 308 is of a hollow structure, so that the force-bearing surface of the tactile switch 308 is in contact with the second area 3061 through the first area 3030 in a state in which the top cover is not pressed or tapped.

In an example of this embodiment, the contact between the force-bearing surface of the tactile switch 308 and the second area 3061 in the foregoing descriptions may be specifically contact with pre-pressure. To be specific, the input apparatus 3 is not pressed or tapped, and there is pressure between the force-bearing surface of the tactile switch 308 and the second area 3061, thereby avoiding an extra invalid stroke.

In another example of this embodiment, the contact between the force-bearing surface of the tactile switch 308 and the second area 3061 in the foregoing descriptions may be specifically contact without pre-pressure. To be specific, the input apparatus 3 is not pressed or tapped, and the force-bearing surface of the tactile switch 308 is in contact with the second area 3061, but no pressure exists. In this example, the force-bearing surface of the tactile switch 308 is in contact with the second area 3061 without pressing or tapping, thereby avoiding an extra invalid stroke.

In an embodiment, the tactile switch 308 may be alternatively mounted on the circuit board bracket 303, and is specifically mounted on a first surface of the first area 3030 of the circuit board bracket 303, so that the force-bearing surface of the tactile switch 308 is in contact with the second area 3061 in a state in which the top cover is not pressed or tapped. The first surface is a surface, facing the base 306, of the circuit board bracket 303.

A protrusion may be disposed on a second surface of the second area 3061. The protrusion may be specifically a structural hammer 30613. The second surface is a surface, facing the top cover, of the second area 3061. The structural hammer 3063 is disposed at a location corresponding to the tactile switch 308. The contact between the force-bearing surface of the tactile switch 308 and the second area 3061 is specifically contact between the force-bearing surface of the tactile switch 308 and the structural hammer 30613.

In an example of this embodiment, the contact between the force-bearing surface of the tactile switch 308 and the second area 3061 in the foregoing descriptions may be specifically contact with pre-pressure. To be specific, the input apparatus 3 is not pressed or tapped, and there is pressure between the force-bearing surface of the tactile switch 308 and the second area 3061, thereby avoiding an extra invalid stroke.

In another example of this embodiment, the contact between the force-bearing surface of the tactile switch 308 and the second area 3061 in the foregoing descriptions may be specifically contact without pre-pressure. To be specific, the input apparatus 3 is not pressed or tapped, and the force-bearing surface of the tactile switch 308 is in contact with the second area 3061, but no pressure exists. In this example, the force-bearing surface of the tactile switch 308 is in contact with the second area 3061 without pressing or tapping, thereby avoiding an extra invalid stroke.

In an embodiment, the tactile switch 308 may be alternatively mounted on a second surface of the second area 3061. The second surface is a surface, facing the top cover, of the second area 3061. In a state in which the top cover is not pressed or tapped, the force-bearing surface of the tactile switch 308 is in contact with the first area.

In an example of this embodiment, the contact between the force-bearing surface of the tactile switch 308 and the first area in the foregoing descriptions may be specifically contact with pre-pressure. To be specific, the input apparatus 3 is not pressed or tapped, and there is pressure between the force-bearing surface of the tactile switch 308 and the first area, thereby avoiding an extra invalid stroke.

In another example of this embodiment, the contact between the force-bearing surface of the tactile switch 308 and the first area in the foregoing descriptions may be specifically contact without pre-pressure. To be specific, the input apparatus 3 is not pressed or tapped, and the force-bearing surface of the tactile switch 308 is in contact with the first area, but no pressure exists. In this example, the force-bearing surface of the tactile switch 308 is in contact with the first area without pressing or tapping, thereby avoiding an extra invalid stroke.

In the input apparatus provided in the embodiments of this application, the connecting rod is disposed between the top cover and the base, the main rod of the connecting rod is nested in the trench on the top cover, the side rod of the connecting rod is nested in the slot on the base, and when the top cover is pressed or tapped, the main rod rotates in the trench, to drive the side rod to slide in the slot, and drive the top cover to entirely move toward the base, so that the strength of the top cover is enhanced without significantly increasing a weight (for example, the connecting rod is lighter than a reinforcing bracket), and the tactile switch can be better triggered.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An input apparatus used in an electronic device, wherein the input apparatus comprises:
 a top cover, wherein a first sub-trench (3032) and a second sub-trench (3031) are disposed in a first area (3030) of the top cover, wherein the first sub-trench (3032) is an outer trench and the second sub-trench (3031) is an inner trench;
 a base (306), wherein a first slot group (30611) and a second slot group (30612) are disposed in a second area (3061) of the base, and projections of the second area (3061) and the first area (3030) in at least one of a pressing direction or a tapping direction overlap;
 a tactile switch (308), comprising a force-bearing surface and disposed on one of the top cover or the base (306); and
 a first connecting rod (304) and a second connecting rod (305), disposed between the top cover and the base (306), wherein the first connecting rod (304) comprises a first main rod (3042) rotatably nested in the second sub-trench (3031) and a first side rod group (3044) slidably nested in the first slot group (30611), wherein the second rod (305) comprises a second main rod (3052) rotatably nested in the first sub-trench (3032) and a second side rod group (3054) slidably nested in the second slot group (30612); and
 when the first area is at least one of pressed or tapped, the first area moves toward the base, so that the first main rod (3042) of the first connecting rod (304) rotates in the second sub-trench (3031) and the first side rod group (3044) of the first connecting rod (304) slides in the first slot group (30611), the second main rod (3052) of the second connecting rod (305) rotates in the first sub-trench (3032) and the second side rod group (3054) of the second connecting rod (305) slides in the second slot group (30612), to drive the first area (3030) to entirely move down, thereby triggering the tactile switch (308);
 wherein the first main rod (3042) of the first connecting rod (304) and the second main rod (3052) of the second connecting rod (305) are parallel to each other; sizes of the first and second connecting rods successively change along a direction toward a connection line between a center of the first area (3030) and a center of the second area (3061).

2. The input apparatus according to claim 1, wherein the top cover comprises a circuit board (302) and a circuit board bracket (303) that are successively stacked along at least one of the pressing or tapping direction; wherein the circuit board bracket (303) is configured to fasten the circuit board (302) and the tactile switch (308) is communicatively connected to the circuit board (302), and the tactile switch (308) is configured to control the circuit board (302); and the first area (3030) is an area on the circuit board bracket (303).

3. The input apparatus according to claim 2, wherein the tactile switch (308) is mounted on the circuit board (302).

4. The input apparatus according to claim 2, wherein the tactile switch (308) is mounted on the first area (3030), so that the force-bearing surface of the tactile switch (308) is in contact with the second area (3061) in a state in which the top cover is not pressed or tapped.

5. The input apparatus according to claim 1, wherein the tactile switch (308) is mounted on the second area (3061), so that the force-bearing surface of the tactile switch (308) is in contact with the first area (3030) in a state in which the top cover is not pressed or tapped.

6. The input apparatus according to claim 1, wherein in a left-right direction of the input apparatus, a middle section of the force-bearing surface of the tactile switch (308) coincides with a middle section of the first area (3030), or a middle section of the force-bearing surface of the tactile switch (308) coincides with a middle section of the second area (3061).

7. The input apparatus according to claim 1, wherein the tactile switch (308) is one of the following:

a metal dome switch and a rubber dome switch.

8. The input apparatus according to claim 1, wherein a force of the tactile switch (308) is greater than or equal to 180 gf.

9. An electronic device, comprising the input apparatus according to claim 1.

10. The input apparatus according to claim 1, wherein the first connecting rod (304) is thinner than the second connecting rod (305).

\* \* \* \* \*